(12) United States Patent
Nakken

(10) Patent No.: US 8,202,066 B2
(45) Date of Patent: Jun. 19, 2012

(54) PISTON ENGINE

(75) Inventor: Mareno Kennet Nakken, Fiksdal (NO)

(73) Assignee: Sperre Mek. Verksted AS, Ellingsoy (NO)

( * ) Notice: Subject to any disclaimer, the term of this patent is extended or adjusted under 35 U.S.C. 154(b) by 1161 days.

(21) Appl. No.: 11/233,567

(22) Filed: Sep. 22, 2005

(65) Prior Publication Data

US 2007/0237657 A1 Oct. 11, 2007

(30) Foreign Application Priority Data

Sep. 24, 2004 (NO) .................................... 20044014

(51) Int. Cl.
F04B 39/06 (2006.01)

(52) U.S. Cl. ........ 417/359; 92/140; 74/579 R; 74/579 E

(58) Field of Classification Search .................. 417/415, 417/222.1, 423, 15, 359; 464/78; 74/579 R, 74/579 E; 123/192.1; 92/140
See application file for complete search history.

(56) References Cited

U.S. PATENT DOCUMENTS

| | | | |
|---|---|---|---|
| 1,844,416 A | | 2/1932 | Bacher et al. |
| 2,278,832 A | | 4/1942 | Cornelius |
| 3,150,506 A | | 9/1964 | Alcaro |
| 4,257,540 A | * | 3/1981 | Wegmann et al. ............ 222/262 |
| 4,836,755 A | | 6/1989 | Nitsche et al. |
| 4,941,807 A | * | 7/1990 | Foster ......................... 417/199.1 |
| 5,299,980 A | * | 4/1994 | Agius ............................. 464/99 |
| 5,675,873 A | * | 10/1997 | Groess ............................. 24/284 |
| 6,439,188 B1 | * | 8/2002 | Davis .......................... 123/193.2 |
| 7,377,035 B2 | * | 5/2008 | Bin-Nun et al. .......... 29/888.048 |

FOREIGN PATENT DOCUMENTS

| | | |
|---|---|---|
| CA | 2085112 | 5/1993 |
| GB | 1 532 553 | 11/1978 |
| JP | 49-043522 | 11/1974 |
| JP | 55-040351 | 3/1980 |
| JP | 61-137120 | 8/1986 |
| JP | 04129965 A * | 4/1992 |
| WO | WO 02/18787 A1 | 3/2002 |

OTHER PUBLICATIONS

"New Coupler is Both Flexible and Stiff" Pressemelding fra Huco Engineering Industrieds Ltd 5, Apr. 2005.
Japanese Office Action for corresponding Japanese Patent Application No. 2005-275112 mailed Mar. 1, 2011.
Japanese Office Action for corresponding Japanese Patent Application No. 2005-275112 mailed Sep. 6, 2011.

* cited by examiner

*Primary Examiner* — Charles Freay
*Assistant Examiner* — Patrick Hamo
(74) *Attorney, Agent, or Firm* — Merchant & Gould P.C.

(57) ABSTRACT

The invention relates to a piston engine comprising one or more air/gas-compressing cylinder-piston units, a crank mechanism connected to the piston in the said cylinder or cylinders for movement of the piston in the cylinder, which crank mechanism is drivingly connected to a rotor in an electric motor. The invention also relates to a coupling and a simple connection for a counterweight.

12 Claims, 9 Drawing Sheets

PISTON ENGINE

TECHNICAL FIELD

The invention relates to a piston engine comprising one or more air/gas-compressing cylinder-piston units, a crank mechanism connected to the piston in the said cylinder or cylinders for movement of the piston in the cylinder, which crank mechanism is drivingly connected with a rotor in an electric motor.

BACKGROUND OF THE INVENTION

The currently known units for compression of gas and particularly air are relatively heavy. Piston engines with a crank mechanism require mass balancing in the piston's direction of motion and means for balancing the uneven running, i.e. a flywheel.

A flywheel is a wheel often with a large diameter and a heavy weight at the wheel rim. Such a wheel needs a long time to change speed when influenced by a moment of force. It is used to smooth the running in piston engines, not only in petrol and diesel engines, but also in compressors. Compressors are machines for transport of gas (for example air) from a lower to a higher pressure level.

Piston compressors are built with one or more cylinders, which may be single or double-acting. Compressors are employed for many purposes, e.g. delivering compressed air for tool operation, brake systems, servomotors for automatic control, starting internal combustion engines, etc. Other areas of application are production of pressure or vacuum for chemical processes, supercharging of combustion engines, gas turbine plant, pneumatic transport, refrigerators, heat pump plant and so on.

In order to keep the cylinder temperature down at a reasonable level in compressors, use is often made of water cooling or air cooling, with the use of ribs to increase efficiency.

A normal compressor operation is the use of an electromotor with belt transmission to the piston compressor's crankshaft.

It is also possible to mount the electromotor in direct alignment with the crankshaft. The electromotor's rotor may be directly connected to the crankshaft, designed together as one unit, or a suitable shaft coupling may be employed that is flexible, thus enabling it to take up inaccuracies in the shaft line.

Many of the currently known compressors with flywheels are exceptionally heavy on account of the flywheel.

It is an object of the invention to provide an air/gas compressor with a relatively low weight and small size.

Another object of the invention is to provide a compressor that is favourable with regard to building and maintenance.

SUMMARY OF THE INVENTION

According to the invention, therefore, a piston engine is proposed as indicated in claim 1.

By using a torsionally-rigid coupling that is flexible in the radial and axial directions and relative to the angle between the rotor in the electric motor and the crank mechanism, it becomes possible to utilise the rotor as a flywheel element, with associated weight saving due to a substantially reduced or eliminated need for additional flywheels. The high torsional rigidity also makes it possible to make use of the rotational moment of the rotor in the electromotor, thus enabling the size of an additionally mounted flywheel to be reduced, or possibly dispensing with a separate flywheel.

The radial, axial and angular flexibility of the coupling makes it possible to balance small misalignments and angular differences in the shaft line between compressor and drive motor. This facilitates the mounting process, for example the flanging of the electric motor on to the actual compressor. The axial flexibility also makes it possible to absorb temperature differences.

According to the invention the torsionally-rigid coupling which is flexible in the angular, axial and radial directions can advantageously be designed as indicated in claims 2-5.

As indicated, the shape of the sleeve wall will provide the desired radial flexibility to enable inaccuracies in the shaft line to be taken up.

The design of the coupling as a sleeve with a clamping ring at one end and with a clampable shaft journal at the other end permits a rapid and simpler assembly/disassembly in the drive train or drive string. The shaft journal is preferably also conically tapering from the coupling's main body towards the crank mechanism and is mounted in a complementarily shaped opening in the crank mechanism's ingoing shaft journal. This helps to centre the coupling relative to the crank mechanism. Furthermore, the coupling's shaft journal towards the crank mechanism is preferably hollow with a centre opening for mounting a screw connection that locks the coupling to the crank mechanism's ingoing shaft, while at the same time the screw connection helps to pull the conical shaft journal into the complementarily shaped opening which also contributes to centering. To facilitate disassembly, the centre opening may additionally be supplied with internal threads that have a larger diameter/dimension then the bolt holding the coupling. During disassembly the retaining bolt is loosened and a new larger bolt is screwed in that abuts against the material in the crank mechanism, thereby pushing the conical connection out of engagement.

Thus the coupling as an axially connected element will also form part of the drive string, which includes the electric motor's rotor and the crank mechanism, as indicated in claim 6, together with the fan wheel (if any) indicated in claim 8.

A particularly maintenance-friendly version includes the counterweight indicated in claim 7.

The synchronising means in claim 9 serves to facilitate the assembly of the counterweight preferably designed with the shaft journal for the fan wheel, which counterweight is easy to disassemble as a result of the clamping coupling on the crank pin in the crank mechanism. In a simple and preferred embodiment the synchronising means may be hollow in the two counterweights, the holes being arranged with an adjustment pin or alignment bolt when mounting the outer counterweight.

BRIEF DESCRIPTION OF THE DRAWINGS

The invention will now be explained in greater detail with reference to the drawings, in which:

FIG. 9 illustrates the component group in FIGS. 7 and 8 supplemented with a radial fan on a shaft journal projecting from the outer counterweight, while

DETAILED DESCRIPTION OF THE INVENTION

In the figures counterweights/flywheels 10 and 11 are alternately called counterweight and counterweight/flywheel since these elements can help with both balancing as a counterweight and as a flywheel if necessary. In the following the designation is not important for the function.

Figure 1:
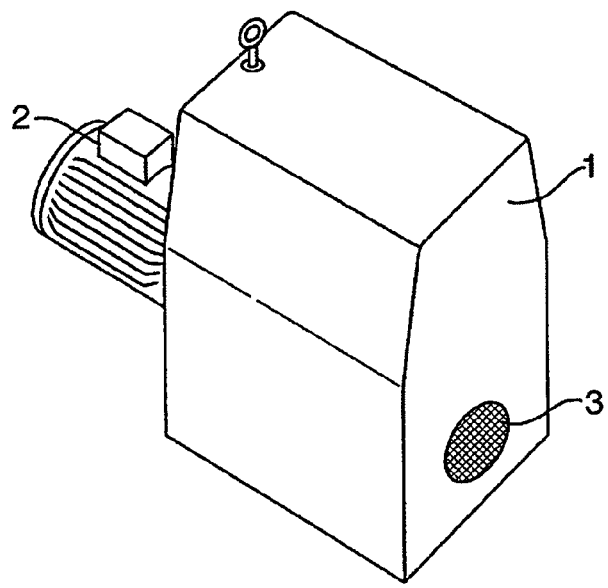
FIG. 1 illustrates a possible embodiment of a compressor according to the invention.

FIG. 1 illustrates a compressor according to the invention as it will appear when mounted, since FIG. 1 only illustrates a housing 1, wherein the actual compressor unit is mounted, and an electromotor 2 flanged on to the compressor unit.

Figure 2:
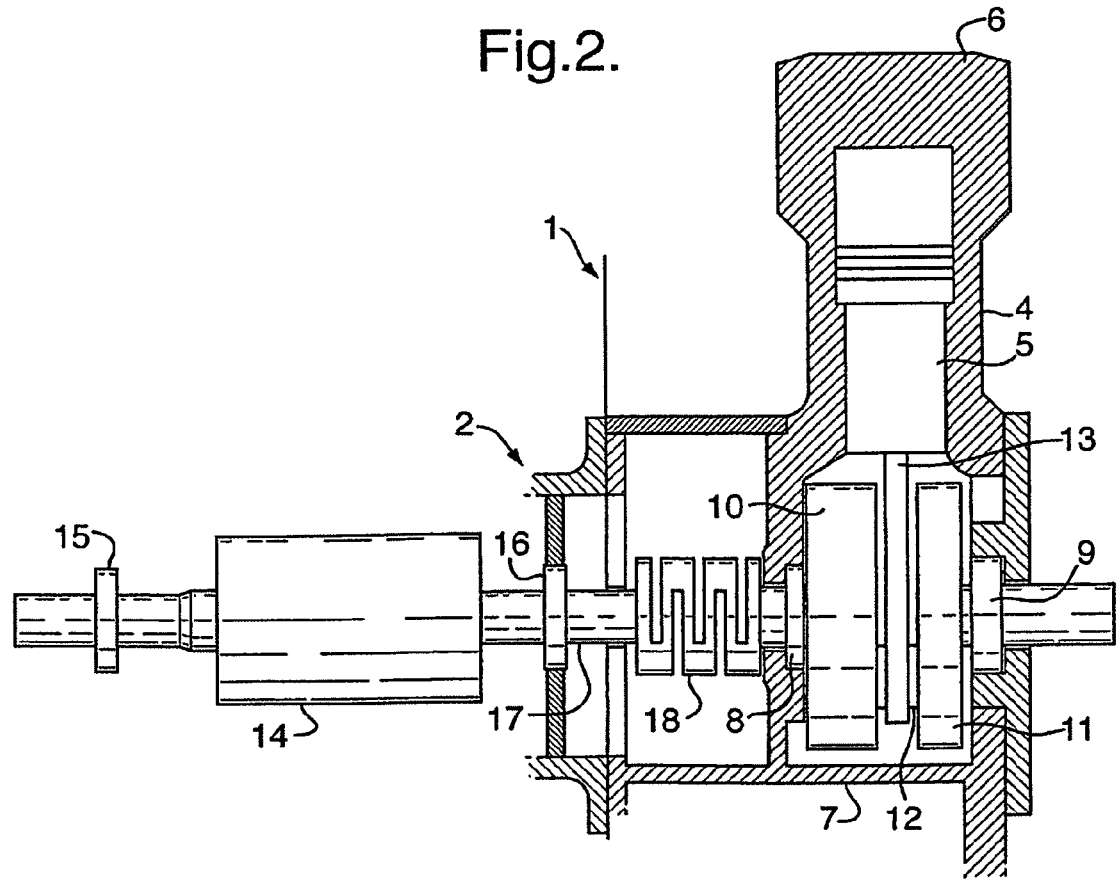
FIG. 2 illustrates a simplified longitudinal section through a compressor according to the invention.

A compressor according to the invention may be designed in general as illustrated in the simplified longitudinal section in FIG. 2.

The compressor illustrated in FIG. 2 is single-cylinder, with a cylinder 4 and a piston 5 forwardly and backwardly movable therein. At the top the cylinder 4 is provided with a head 6 where the necessary valves (not shown) are mounted. In a crankcase 7, by means of bearings 8, 9, a crank mechanism is mounted containing two flywheels/counterweights 10 and 1. Between the counterweights 10, 11 is mounted a crank pin 12 which operates in conjunction with a piston rod 13 mounted in the piston 5.

An electromotor 2 (not shown in FIG. 2) flanged on to the housing 1 has a rotor 14. The rotor 14 is mounted in the bearings 15, 16 and the rotor 14, or more specifically its shaft 17, is drivingly connected to the crank mechanism 10, 11, 12 by means of a torsionally-rigid coupling 18. As already mentioned, this coupling 18 is torsionally-rigid, but otherwise is flexible, thus enabling it to take up inaccuracies in all directions (radial, axial and angular) of the electromotor relative to the crankshaft/crankcase. This permits the electromotor to be mounted in a per se accurate fashion, but without the need for special alignment for compensating for any inaccuracies.

The torsional rigidity in the coupling 18 will make it possible to make use of the rotational moment of the rotor 14 in the electromotor 2, thereby permitting a reduction in the size of the flywheel part, which is represented here by the counterweight/flywheel 10.

Figure 3:
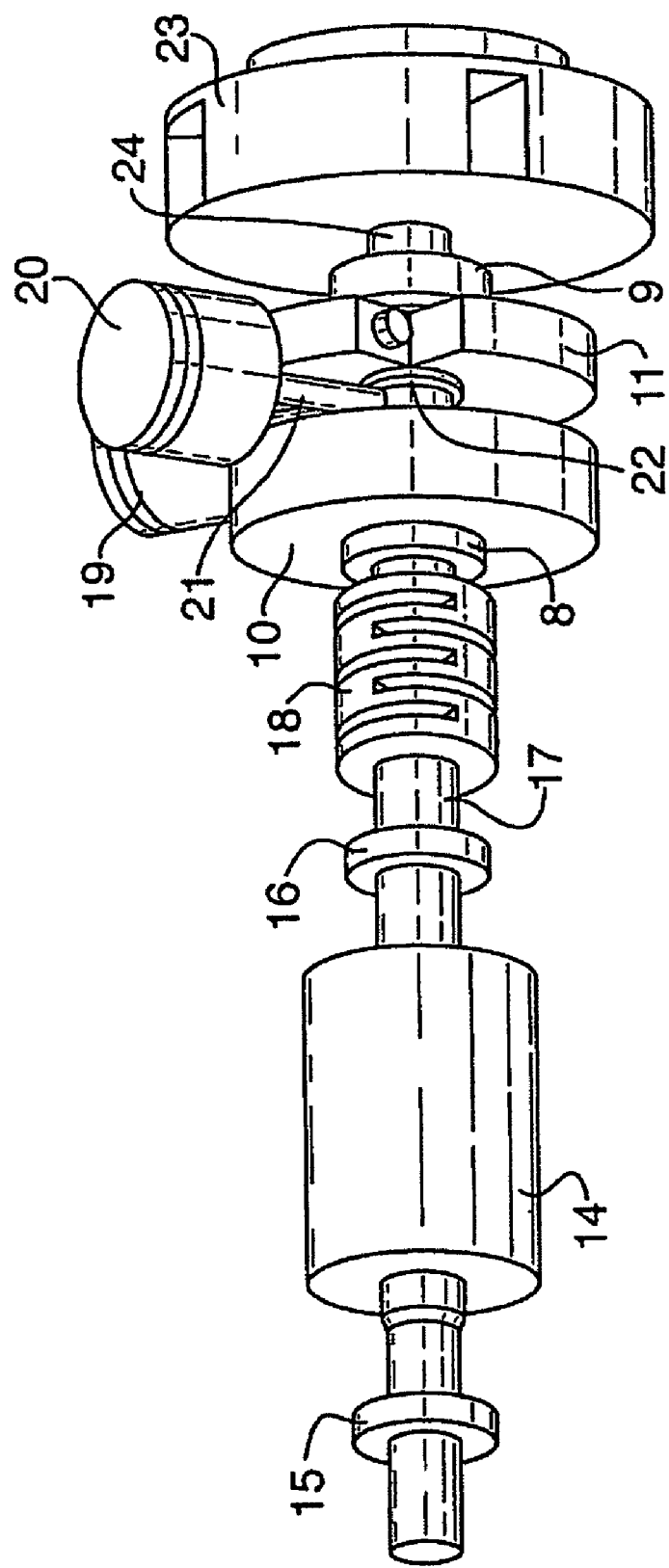
FIG. 3 is a simplified perspective view of the principal elements in a second embodiment of a compressor according to the invention.

FIG. 3 illustrates a modified embodiment of the compressor with two angled cylinders/pistons. Otherwise the same components can be found here as in FIG. 2, viz. The electromotor's rotor 14 with the bearings 15, 16, the torsionally-rigid coupling 18, the flywheel/counterweight 10, the bearings 8 and 9 and the external flywheel/counterweight 11. However, there is a difference between the two embodiments since FIG. 2 shows a crank pin between the counterweights while FIG. 3 shows a crank disk between the counterweights. Like the crank pin, this crank disk provides an eccentric movement for the crank rod(s) but has a larger diameter and is designed together with one of the counterweights as one unit.

Instead of only one piston 5 in a cylinder 4, as in FIG. 2, the compressor in FIG. 3 is composed of two angled pistons 19 and 20 with crank rods 21, 22.

FIG. 3 further illustrates a radial fan wheel 23 mounted on a shaft journal 24. In a ready-mounted state the radial fan wheel 23 will be located immediately inside the opening 3 in the housing 1 (see FIG. 1) and serves to draw air into the housing or chamber 1.

Figure 4:
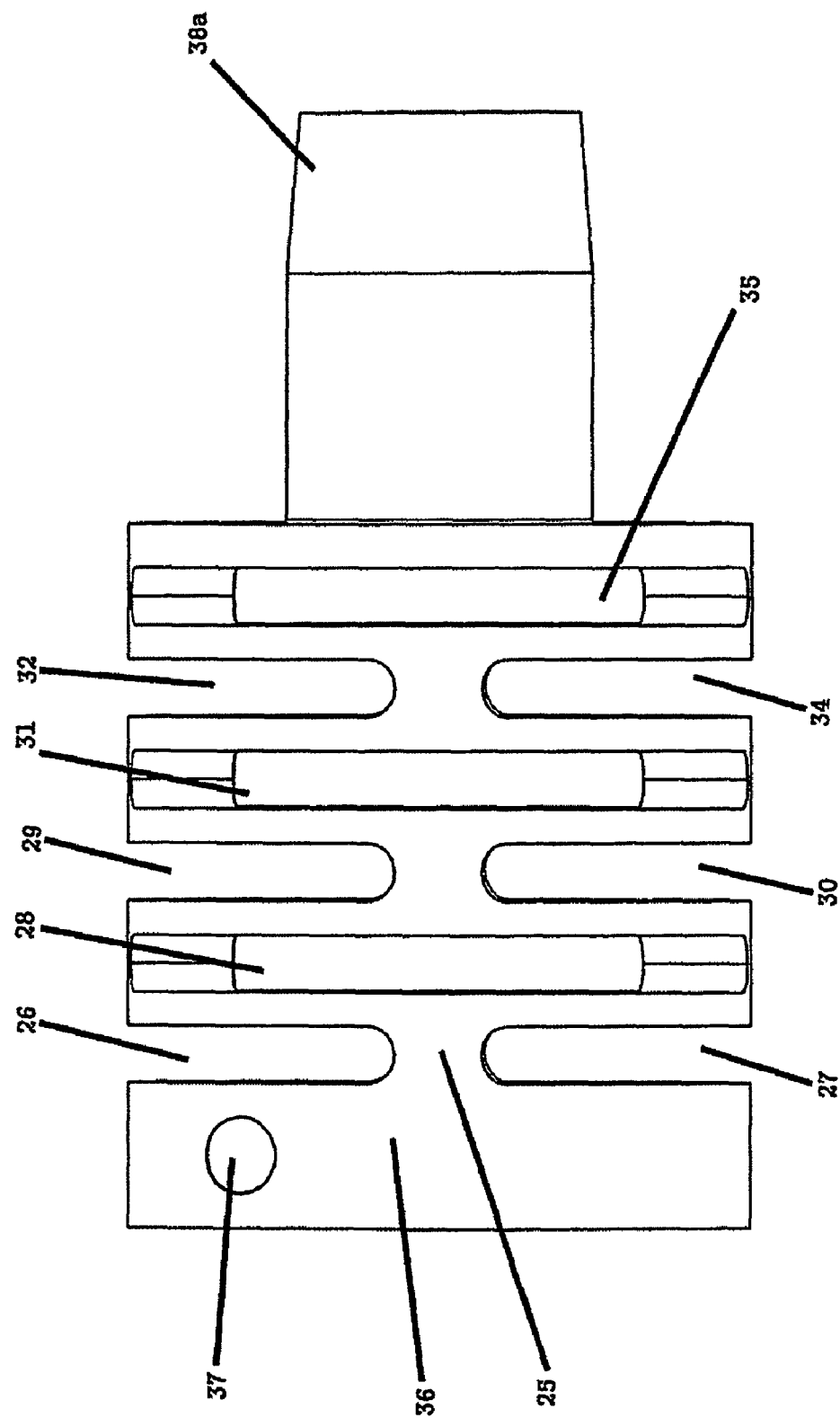
FIG. 4 is a side view of a special coupling according to the invention.
Figure 5:
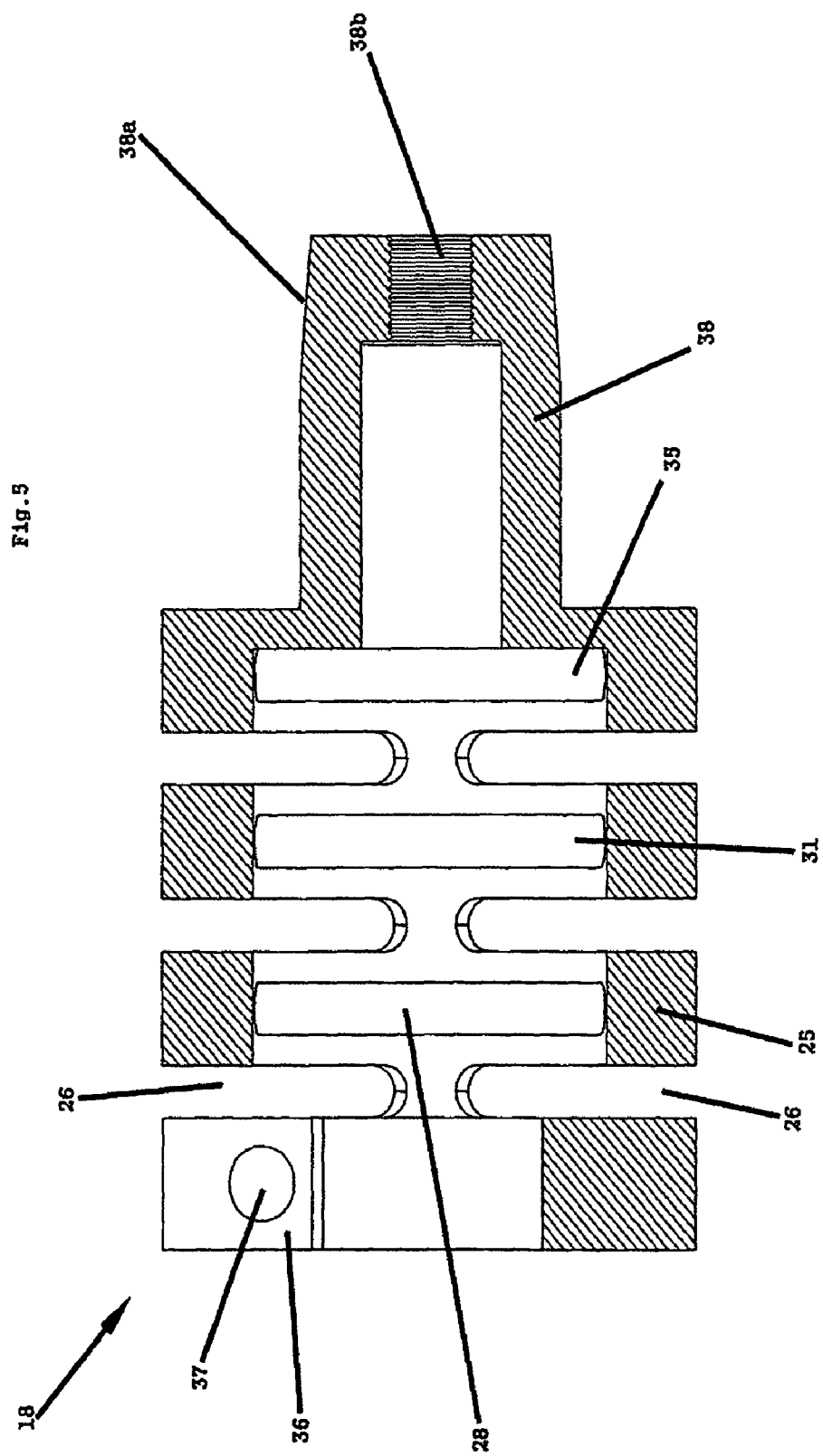
FIG. 5 is a longitudinal section through the coupling illustrated in FIG. 4.
Figure 6:
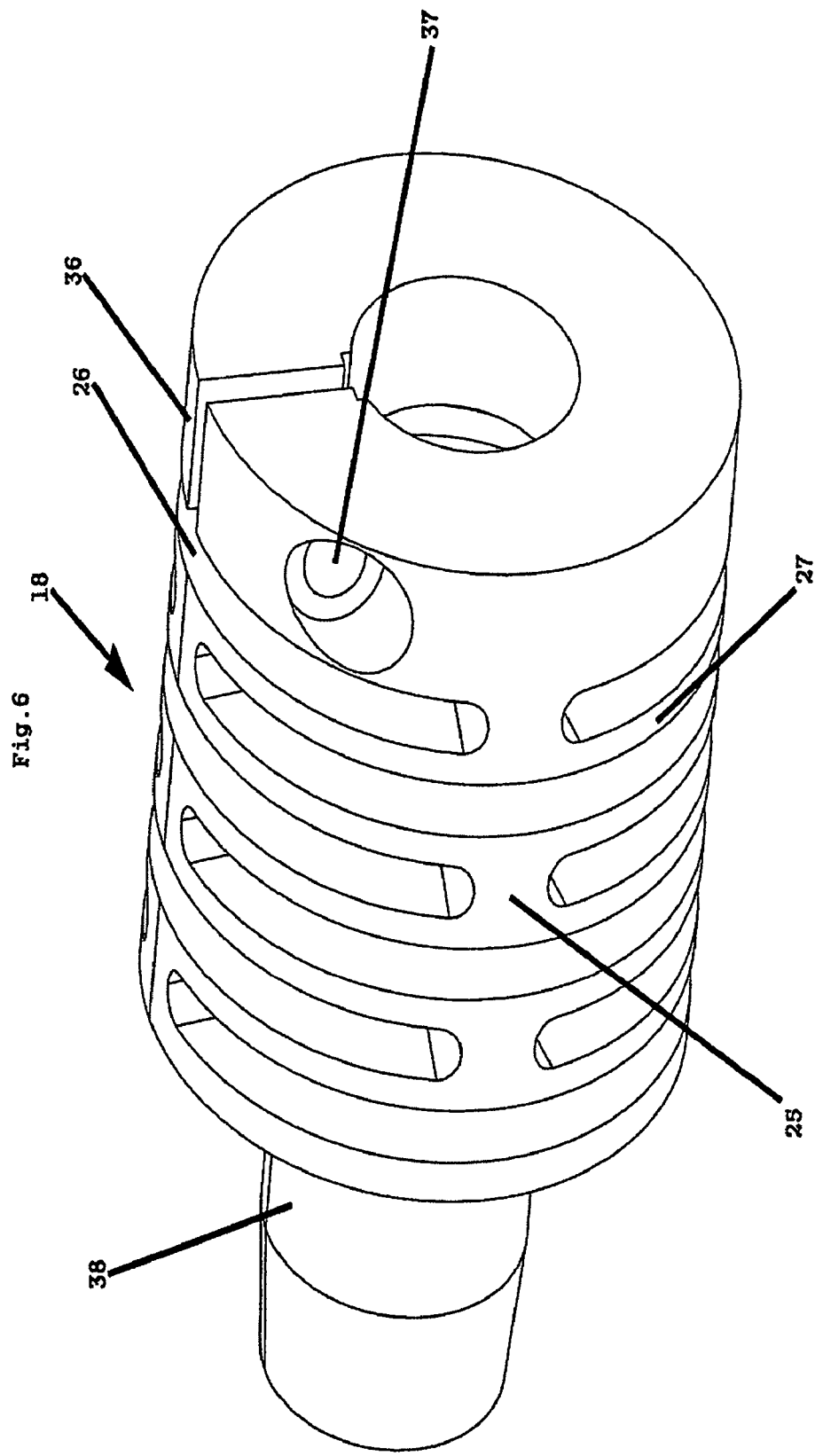
FIG. 6 is a perspective view of the coupling in FIGS. 4 and 5, slightly enlarged.

A particularly advantageous embodiment of the coupling 18 is illustrated in FIGS. 4, 5 and 6.

The coupling 18 is substantially designed as a sleeve body where the sleeve wall 25 is provided with pairs of sleeve wall slots 26, 27, 28, 29, 30, 31, 32, 33, 35 located behind one another, distributed in relation to one another over the periphery and in the sleeve's longitudinal direction.

At one end, more specifically the end facing the electromotor's rotor 14 and its shaft 17, the sleeve part of the coupling 18 is in the form of a clamping ring 36. With this clamping ring the sleeve, i.e. the coupling 18, can be connected to the rotor shaft 17 inserted in the sleeve. This is done in the known manner by the clamping ring being tightened up by means of a screw not illustrated here, which passes through the bore 37. At the other end of the coupling 18 there is provided a shaft journal 38.

It can be seen from FIG. 4 that the shaft journal 38 has a conically tapering end 38a. This may extend over the whole or parts of the shaft journal 38. It is further evident from FIG. 5 that the coupling's shaft journal 38 is hollow with a central opening 38b for mounting a centred screw connection connecting the coupling with the crank mechanism. The opening in the crank mechanism is complementarily shaped relative to the shaft journal 38 with the conical portion 38a and in addition the opening is provided with threads for a screw connection through the central opening 38b in the coupling. Furthermore, it is shown that the opening 38b has internal threads as mentioned above.

A coupling or coupling sleeve 18 constructed as in FIGS. 4, 5 and 6 will have a very high degree of torsional rigidity, but otherwise will be flexible on account of the slots in the sleeve wall, thus enabling the coupling 18 to take up inaccuracies in all directions, both angular difference and radial misplacement/misalignment and axial change particularly due to temperature.

FIGS. 7, 8, 9 and 10 illustrate further details with regard to the crankshaft, the pistons and the cooling fan (if any).

Figure 7:
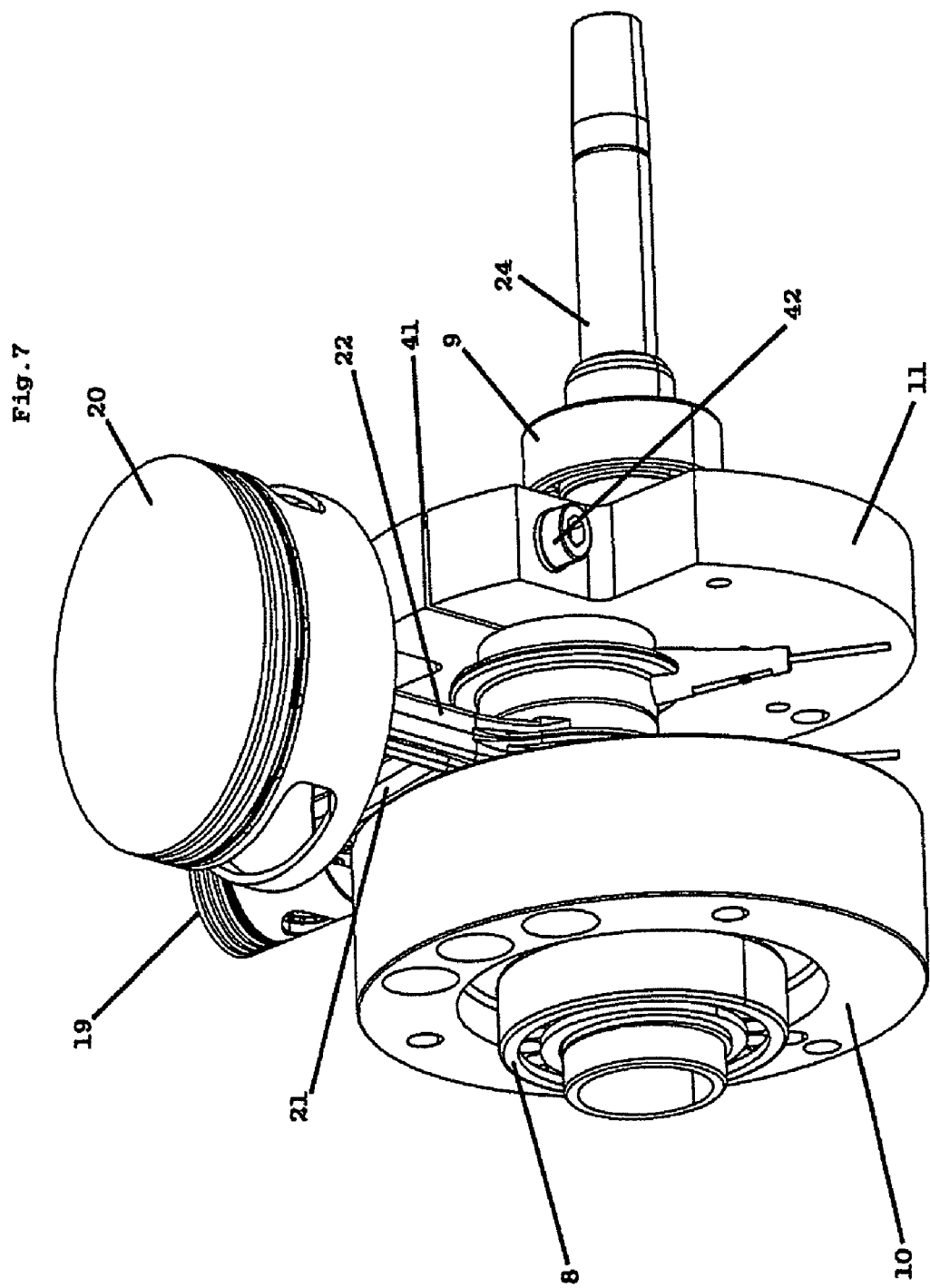
FIG. 7 is a perspective view of the pistons and associated counterweights in the embodiment in FIG. 3.
Figure 8:
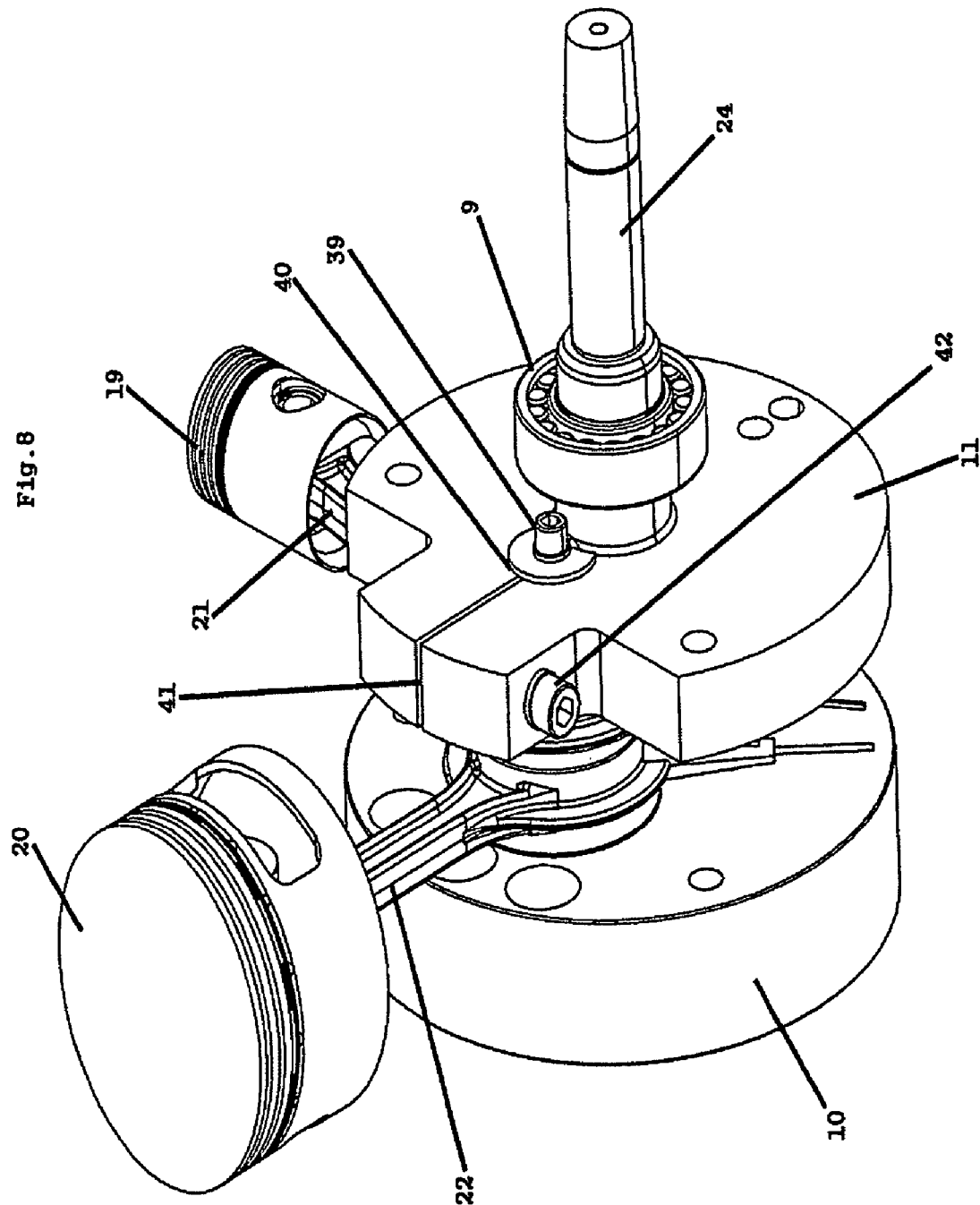
FIG. 8 illustrates the same component group as in FIG. 7, but viewed from the other side.

In FIGS. 7 and 8 the coupling 18 and the radial fan wheel 23 are omitted. In FIGS. 7 and 8 can be seen the flywheel/counterweight 10, the external counterweight 11 clamped to the crank disk 39, the shaft journal 24 connected to the counterweight 11 and the bearings 8 and 9. The pistons 19, 20 and their respective crank rods 21, 22 are also illustrated.

The counterweight/flywheel 10 is provided with a hollow shaft journal for working with the bearing 8 and for receiving the sleeve journal 38 on the coupling 18. This hollow shaft journal is complementarily shaped relative to the shaft journal 38a on the coupling and is provided with a threaded centre opening for a screw connection between the coupling and the flywheel/counterweight.

The flywheel/counterweight 11 is shown in the form of an element that can be clamped to the crank pin/crank disk 39, see particularly FIG. 8. For this purpose the counterweight 11 is provided with a bore 40 for receiving the crank pin/crank disk 39, and outwardly from this bore 40 the counterweight 11 is split as illustrated by 41. The counterweight 11 is clamped by means of the screw bolt 42. The counterweight 11 is designed together with a shaft journal 24 as one unit, intended for working in conjunction with the bearing 9 and for receiving the fan wheel 23 (if any).

Figure 9:
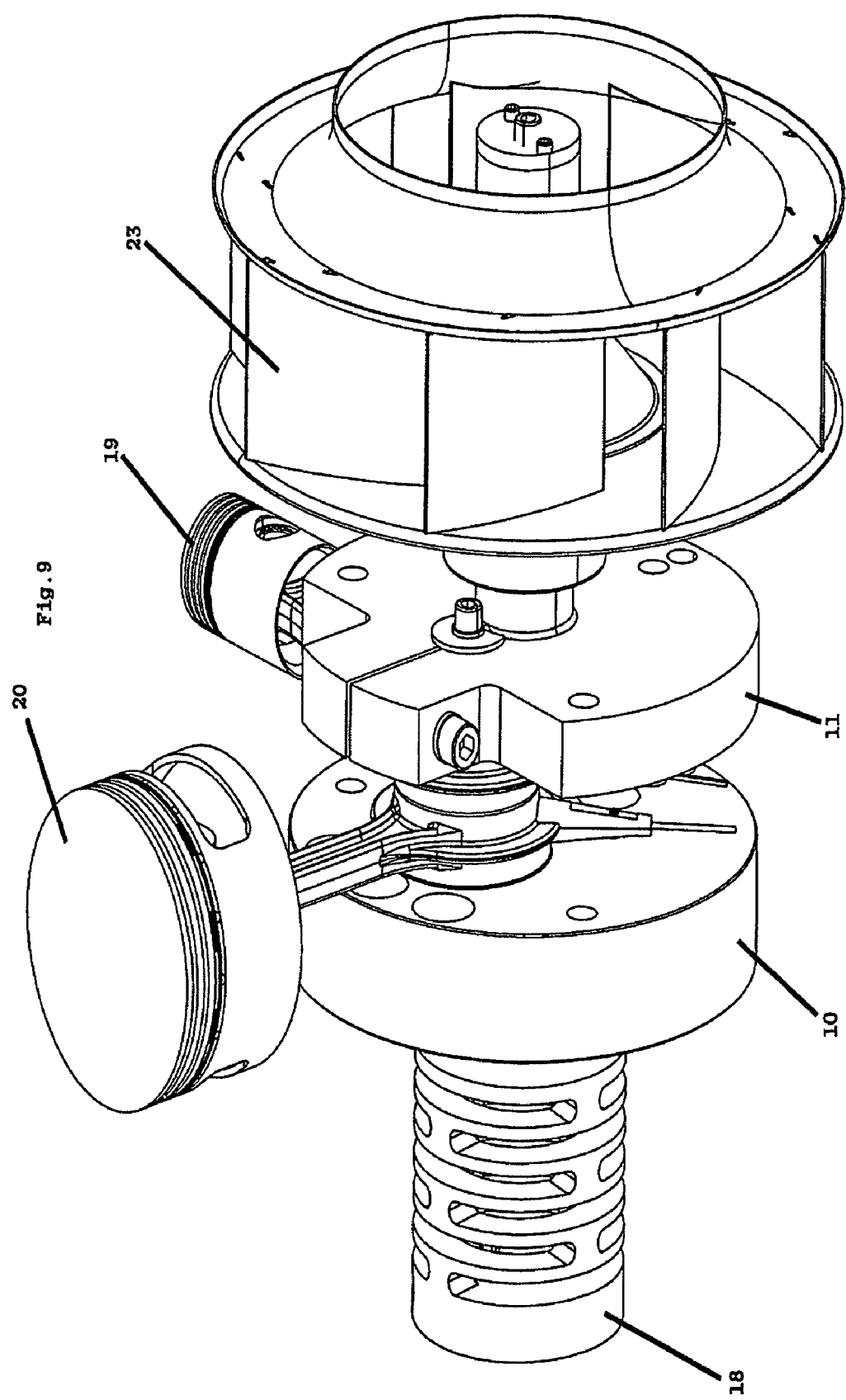
Figure 10:
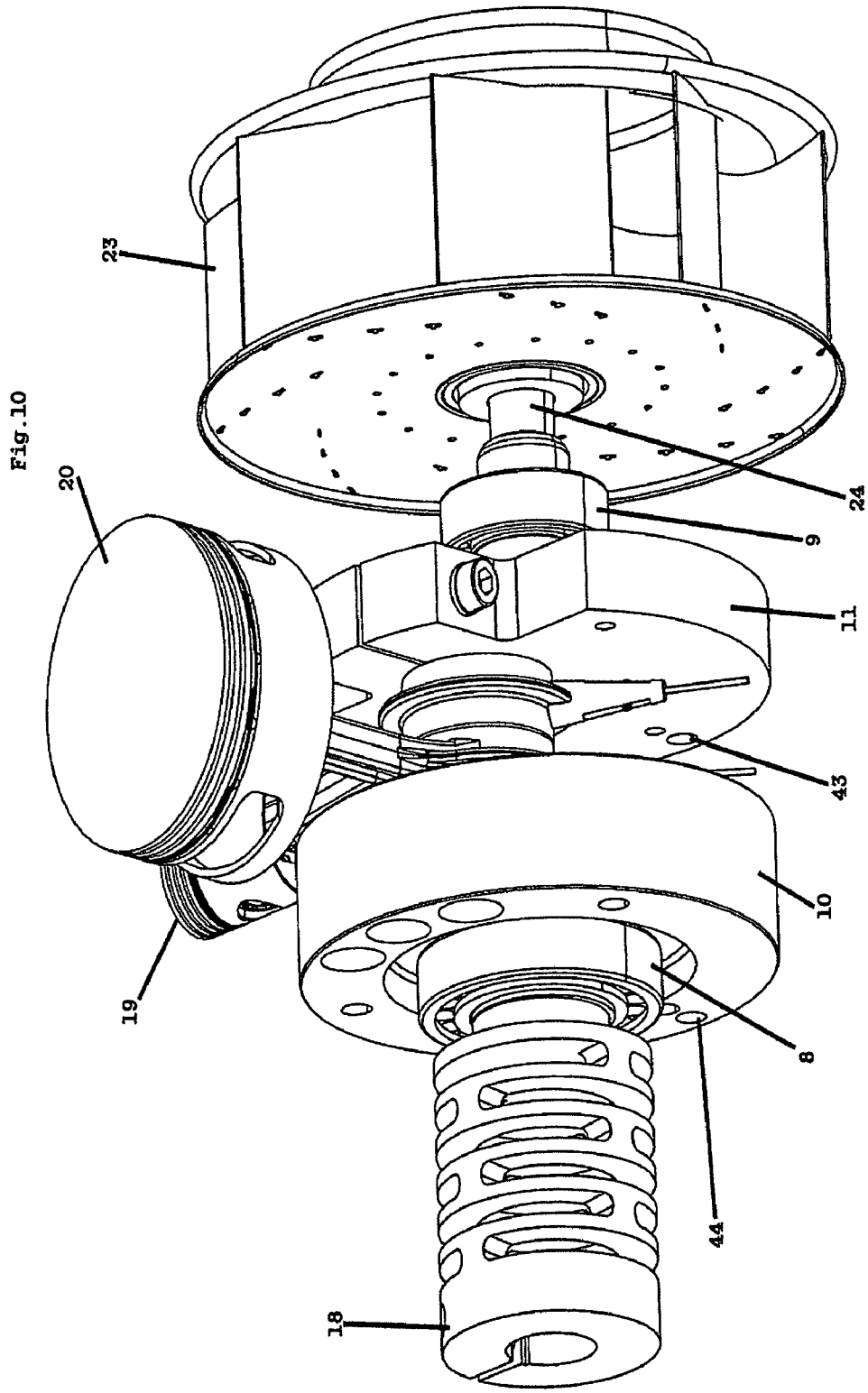
FIG. 10 illustrates the component group in FIG. 9 viewed from another side.

As already mentioned, FIGS. 9 and 10 illustrate the same details as in FIGS. 7 and 8, but in addition they also show the coupling 18 and a radial fan wheel 23 mounted.

As already mentioned, the counterweight 11 is in the form of a releasable body relative to the crank disk 39. To facilitate the assembly and the accurate positioning of the counterweight 11 relative to the pistons and the counterweight 10, the two counterweights 10 and 11 are provided with aligned registration holes 43, 44 (see FIG. 10). By means of an alignment pin/synchronising bolt which is inserted in the two holes, the counterweight 11 can be brought into the correct angular position on the crank disk 39.

The invention claimed is:

1. A piston engine comprising one or more air/gas-compressing cylinder/piston units, a crank mechanism connected to a piston in the one or more air/gas-compressing cylinder/piston units for movement of the piston, a flywheel connected to the crank mechanism;
wherein the crank mechanism is drivingly connected to a rotor in an electric motor through a flexible coupling between the rotor and the crank mechanism, wherein the mass of the rotor is part of the mass of the flywheel;
wherein the flexible coupling is torsionally rigid but otherwise flexible, thus taking up one or more of axial and/or angular differences of distances and angular difference, the flexible coupling comprising a sleeve body with a sleeve wall;
wherein the shape of the sleeve wall results from the sleeve wall being provided with one or more radial slots distributed in relation to one another over the periphery and placed behind one another in the sleeve's longitudinal direction, the slots being distributed over the periphery;
wherein the flexible coupling, the motor and the crank mechanism are constructed and assembled together to enable the rotor in the electric motor to serve as a flywheel for the crank mechanism.

2. A piston engine according to claim 1, wherein the sleeve has two ends and one of the two ends of the sleeve is in the form of a clamping ring or shaft journal and the other of the two ends of the sleeve is in the form of a shaft journal or clamping ring.

3. A piston engine according to claim 2, wherein the shaft journal is conically tapering over the whole or parts of its length and has a centrally through-going opening for a screw connection.

4. A piston engine according to claim 1, wherein the rotor, the coupling and the crank mechanism are axially connected to clamping ring couplings.

5. A piston engine according to claim 1, wherein the flywheel in the crank mechanism is clamped to a crank pin in the crank mechanism, the flywheel having a size that is based upon the rotational moment of the motor rotor.

6. A piston engine according to claim 5,
wherein the clamped flywheel and a second flywheel have common synchronising means.

7. A method to drivingly connect a piston engine comprising:
providing one or more gas compressing cylinder and piston units;
providing a crank mechanism connected to a piston in the one or more gas compressing cylinder and piston units for movement of the piston with a rotor in an electric motor;
providing a crank flywheel connected to the crank mechanism such that a mass of the rotor is included in the total rotating flywheel mass of the piston engine;
wherein the rotary motion between the rotor and the crank mechanism is transferred by the step of providing a coupling, which coupling is torsionally rigid but otherwise flexible, thus taking up one or more of the differences between the rotor and the crank mechanism according to angular difference, axial distance and radial distance both in set up and under rotary motion, the flexible coupling comprising a sleeve body with a sleeve wall, where the shape of the sleeve wall results from the fact that the sleeve wall is provided with one or more slots distributed in relation to one another over the periphery and placed behind one another in the sleeve's longitudinal direction, the slots being distributed over the periphery.

8. A method according to claim 7, wherein the sleeve has two ends and one of the two ends of the sleeve is in the form of a clamping ring or shaft journal and the other of the two ends of the sleeve is in the form of a shaft journal or clamping ring.

9. A method according to claim 8, wherein the shaft journal is conically tapering over the whole or parts of its length and has a centrally through-going opening for a screw connection.

10. A method according to claim 7, wherein the rotor, the coupling and the crank mechanism are axially connected with clamping ring couplings.

11. A method according to claim 7, wherein a the flywheel in the crank mechanism is clamped to a crank pin in the crank mechanism.

12. A piston engine comprising one or more air/gas-compressing cylinder/piston units, a crank mechanism connected to a piston in the one or more air/gas-compressing cylinder/piston units for movement of the piston, which crank mechanism is drivingly connected to a rotor in an electric motor through a flexible coupling between the rotor and the crank mechanism, wherein the coupling is torsionally rigid but otherwise flexible, thus taking up one or more of axial and/or angular differences of distances and angular difference, the flexible coupling comprising a sleeve body with a sleeve wall where the shape of the sleeve wall results from the sleeve wall being provided with one or more radial slots distributed in relation to one another over the periphery and placed behind one another in the sleeve's longitudinal direction, the slots being distributed over the periphery;
wherein the flexible coupling, the motor and the crank mechanism are constructed and assembled together to enable the rotor in the electric motor to serve as a flywheel for the crank mechanism;
wherein the sleeve has two ends and one of the two ends of the sleeve is in the form of a clamping ring or shaft journal and the other of the two ends of the sleeve is in the form of a shaft journal or clamping ring;
wherein the shaft journal is conically tapering over the whole or parts of its length and has a centrally through-going opening for a screw; connection; the piston engine further comprising a bolt passing through the centrally through-going opening and connecting the coupling to the crank mechanism, the bolt having a first diameter;
wherein the centrally through-going opening for a screw connection further comprises internal threads having a second diameter, the second diameter being greater than the first diameter of the bolt, the internal threads being for pushing the coupling out of engagement with the crank mechanism with a bolt having a diameter matching the second diameter.

* * * * *